United States Patent
Mo et al.

(10) Patent No.: US 8,102,451 B2
(45) Date of Patent: Jan. 24, 2012

(54) VLN BIASING SCHEME TO ACHIEVE LOW VERTICAL SHADING FOR HIGH-SPEED AND LARGE-FORMAT CMOS IMAGE SENSORS WITH TOP/BOTTOM READOUT SCHEME

(75) Inventors: Yaowu Mo, Arcadia, CA (US); Yandong Chen, Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 713 days.

(21) Appl. No.: 12/264,629

(22) Filed: Nov. 4, 2008

(65) Prior Publication Data

US 2010/0110254 A1    May 6, 2010

(51) Int. Cl.
*H04N 5/335* (2011.01)

(52) U.S. Cl. ..................... 348/308

(58) Field of Classification Search ............... 348/308, 348/294, 257
See application file for complete search history.

(56) References Cited

U.S. PATENT DOCUMENTS

| 5,115,327 A | 5/1992 | Ishima |
| 7,221,397 B1 | 5/2007 | Kochi |
| 7,969,494 B2 * | 6/2011 | Ladd et al. ............ 348/308 |
| 2005/0264666 A1 | 12/2005 | Iwasawa et al. |

FOREIGN PATENT DOCUMENTS

JP    5199453    8/1993

* cited by examiner

*Primary Examiner* — Hung Dang
(74) *Attorney, Agent, or Firm* — RatnerPrestia (57) ABSTRACT

A VLN biasing scheme implemented in an image sensor with top/bottom readout. A first and second current sink coupled to the top of a first column of pixels and a second column of pixels respectively. A third and fourth current sink coupled to the bottom of a first column of pixels and a second column of pixels respectively. During column readout, each current sink sinks an equal amount of current.

22 Claims, 7 Drawing Sheets

VLN BIASING SCHEME TO ACHIEVE LOW VERTICAL SHADING FOR HIGH-SPEED AND LARGE-FORMAT CMOS IMAGE SENSORS WITH TOP/BOTTOM READOUT SCHEME

BACKGROUND OF THE INVENTION

A semiconductor imaging device typically includes an array of pixel cells for capturing image. In general, a group of color capturing pixels are arranged in one of many possible configurations. In one example, the color capturing pixels may be arranged in a four pixel Bayer pattern which includes two green pixels (may be dark green and light green), one red pixel and one blue pixel arranged in a square. The four color pixels are split into pairs, wherein each pair is on a separate column. Each of the columns is coupled to top readout circuitry wherein the pixel values are read from the top of the column, and are also coupled to bottom readout circuitry wherein the pixel values are read from the bottom of the column.

DETAILED DESCRIPTION OF THE INVENTION

An electronic imager typically includes an array of pixels for capturing an image. In general, these pixels are arranged in color patterns for capturing color images.

In one example, the pixels in an electronic imager may be arranged in a Bayer pattern which consists of a green pixel and red pixel in one row and a blue pixel and green pixel in an immediately adjacent row on the same column. In this configuration, one of the green pixels may be a light green pixel. The top and bottom of each column may be coupled to readout circuitry via a switch. Therefore, values of each pixel in the pattern may be read from the top or the bottom of their respective column. Each column may have additional circuitry including a current sink in order to draw current from each pixel in the column, thereby producing a voltage on the column during top/bottom readout. In particular, the current sink defines a range of voltages at a node connecting the pixels and the readout circuitry based on the amount of current that it draws.

One drawback to top/bottom readout is vertical shading, which is a gradual increase or decrease among pixel values in a column that changes with the row number of the pixel. Vertical shading may be attributed to a difference in settling error between top and bottom readout paths. This is mainly due to the resistance of the pixel output routing path (i.e. the column bus). In the current trend of image sensor development, the number of pixels in an imager is being increased without significantly increasing the physical pixel array size, resulting in narrower column lines. Therefore, the column bus resistance of the pixel array is increasing at an accelerated pace as the number of rows increase. Another contributing factor to vertical shading is DC voltage shading in the array due to a voltage drop along the routing path. DC voltage shading is an erroneous offset, that depends on the DC operating point of the source follower in the pixel readout circuitry. Adding a DC offset may change the DC operating point and thus cause an error. Yet another concern is the mismatch between the top and bottom readout channels of the readout circuitry. Top/bottom mismatch is in large part due to the position in the column wherein the column is biased. This may lead to relatively large top/bottom DC voltage differences.

Figure 1:
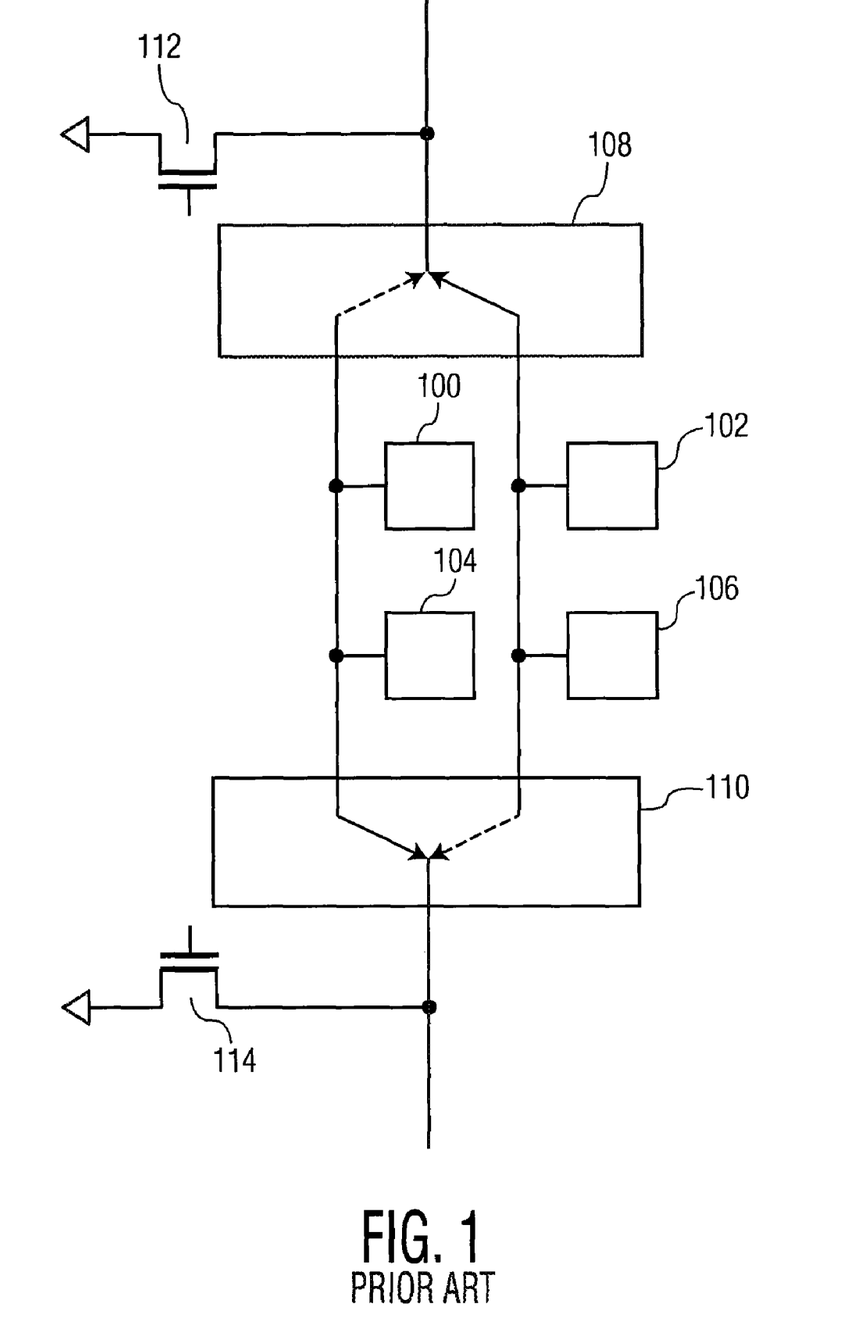
FIG. 1 (Prior Art) is a schematic diagram of a column VLN bias arrangement used in the CMOS imager wherein the VLN bias is applied after the swap switch.

FIG. 1 shows a conventional biasing arrangement that may be used in image sensors including: red pixel 100 that captures red light intensity; green pixels 102 and 104 that captures green light intensity; blue pixel 106 that captures blue light intensity; swap switches 108 and 110 that couple the pixels to top/bottom readout circuitry; and current sink transistors 112 and 114 that bias the source follower amplifiers in the pixels which produce voltage signals during readout. The configuration as shown in FIG. 1 will be referred to as Scheme0 hereafter. Scheme0 is a configuration where current sink transistors 112 and 114 are coupled to the Bayer pattern pixels via swap switches 108 and 110. In this configuration, the current sink transistors 112 and 114 are on the same side of the array as the column readout for each pixel in the pattern.

Operation of Scheme0 is now described with reference to FIG. 1. In one example, the readout of the Bayer pattern pixels is performed in two steps. In one step, green pixel 104 is read from the top of the column via switch 108 while blue pixel 106 is read from the bottom of the column via switch 110. In another step, green pixel 102 is read from the top of the column via switch 108 while red pixel 100 is read from the bottom of the column via switch 110. During top readout, transistor 112 is controlled by biasing voltage VLN. As VLN is applied to transistor 112 during top readout, current flows from the top of the pixel column, through transistor 112, to a reference potential (e.g. ground) thereby producing a voltage on the top of the column. Likewise, during bottom readout, transistor 114, is controlled by VLN to produce a current flow from the bottom of the pixel column, through transistor 114 to ground thereby producing a voltage at the bottom of the column. These voltages are sampled and digitized to generate digital pixel values.

Because transistors 112 and 114 are coupled to the top and bottom of the columns during top and bottom readout respectively, they are referred to as being on the same side of the array as the column readout. Furthermore, transistors 112 and 114 are coupled to the columns on the other side of the swap switches 108 and 110 from the pixel array. The connection of transistors 112 and 114 to the columns after swap switch 108 and 110, and hence on the same side of the column readout for the pixels, results in a relatively large DC voltage difference between top and bottom readout signal paths for a given column. This DC voltage difference is mainly due to the resistance of the pixel output bus. Furthermore, since swap switches 108 and 110 are connected to the DC paths of the pixel readout circuit (not shown), and the resistance to turn on swap switches 112 and 114 is dependent on the pixel output voltage, Scheme0 also has large DC gain non-linearity in the pixel output.

Figure 2:
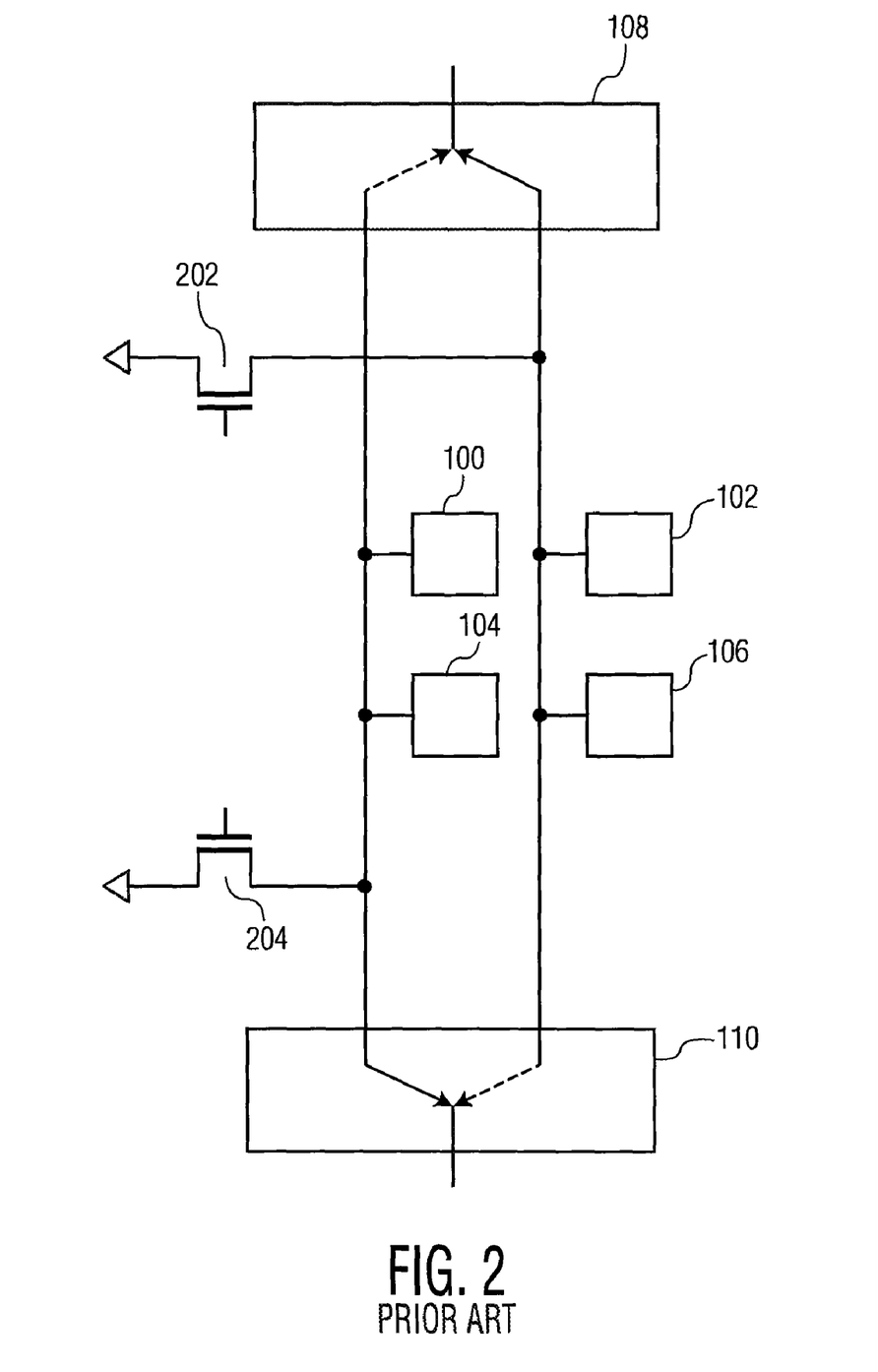
FIG. 2 (Prior Art) is an example of a column VLN bias arrangement used in the CMOS image sensor wherein the VLN biasing is applied before the swap switch with independent VLN for each column.

FIG. 2 shows another conventional biasing arrangement that may be used in image sensors including: red pixel 100; green pixels 102 and 104; blue pixel 106; swap switches 108 and 110; and current sink transistors 202 and 204 that bias the pixel source follower transistors during readout. The configuration as shown in FIG. 2 will be referred to as Scheme1 hereafter. Scheme1 is a configuration where current sink transistors 202 and 204 are coupled directly to the column line before the swap switches. Using the readout scheme provided above, the current sink transistors 202 and 204 are on the same side of the array as the column readout for the pixels for the top row of pixels 100 and 102, and on the opposite side of the array as the column readout for the pixels for the bottom row of pixels 104 and 106.

Operation of Scheme1 is now described with reference to FIG. 2. In one example, the readout of the Bayer pattern pixels is performed in two steps. In one step, green pixel 102 is read from the top of the column via switch 108 while red pixel 100 is read from the bottom of the column via switch 110. In another step, green pixel 104 is read from the top of the column via switch 108 while blue pixel 106 is read from the bottom of the column via switch 110. Current sink transistor 202 is on the same side of the top column readout for green pixel 102 and on the opposite side of the bottom column readout for blue pixel 106. Likewise, transistor 204 is on the same side of the bottom column readout for red pixel 100 and on the opposite side of the top readout for green pixel 104. During top and bottom readout of pixels 102 and 106 respectively, biasing voltage VLN controls transistor 202. As VLN is applied to transistor 202 during top and bottom readout, current flows from the pixel through transistor 203 at the top of the pixel column, to a ground thereby producing a pixel voltage on the column. Likewise, during top and bottom readout of pixels 100 and 104, transistor 204 is controlled by VLN to produce a current flow from the pixel to the bottom of the pixel column through transistor 204 to ground, thereby producing a pixel voltage on the column.

Transistors 202 and 204 are coupled to the columns on the same side of the swap switches 108 and 110 as the pixels. Biasing pixels 100 and 102 on the same side of the column readout, causes a DC voltage difference between top and bottom readout signal paths. This DC voltage difference is mainly due to resistance of the pixel output bus. In contrast, by biasing pixels 104 and 106 on the opposite side of the column readout, the voltage drop caused by the resistance of the pixel output bus is not part of the signal path during readout. Without these voltage drops, the difference between top/bottom DC voltages is almost zero. Thus, readout of pixels 100 and 102 are more affected by DC voltage difference than the readout of pixels 104 and 106. Furthermore, since swap switches 108 and 110 are not connected to the DC paths of the pixel readout circuit, Scheme1 also has improved DC gain linearity in the pixel output.

Figure 3:
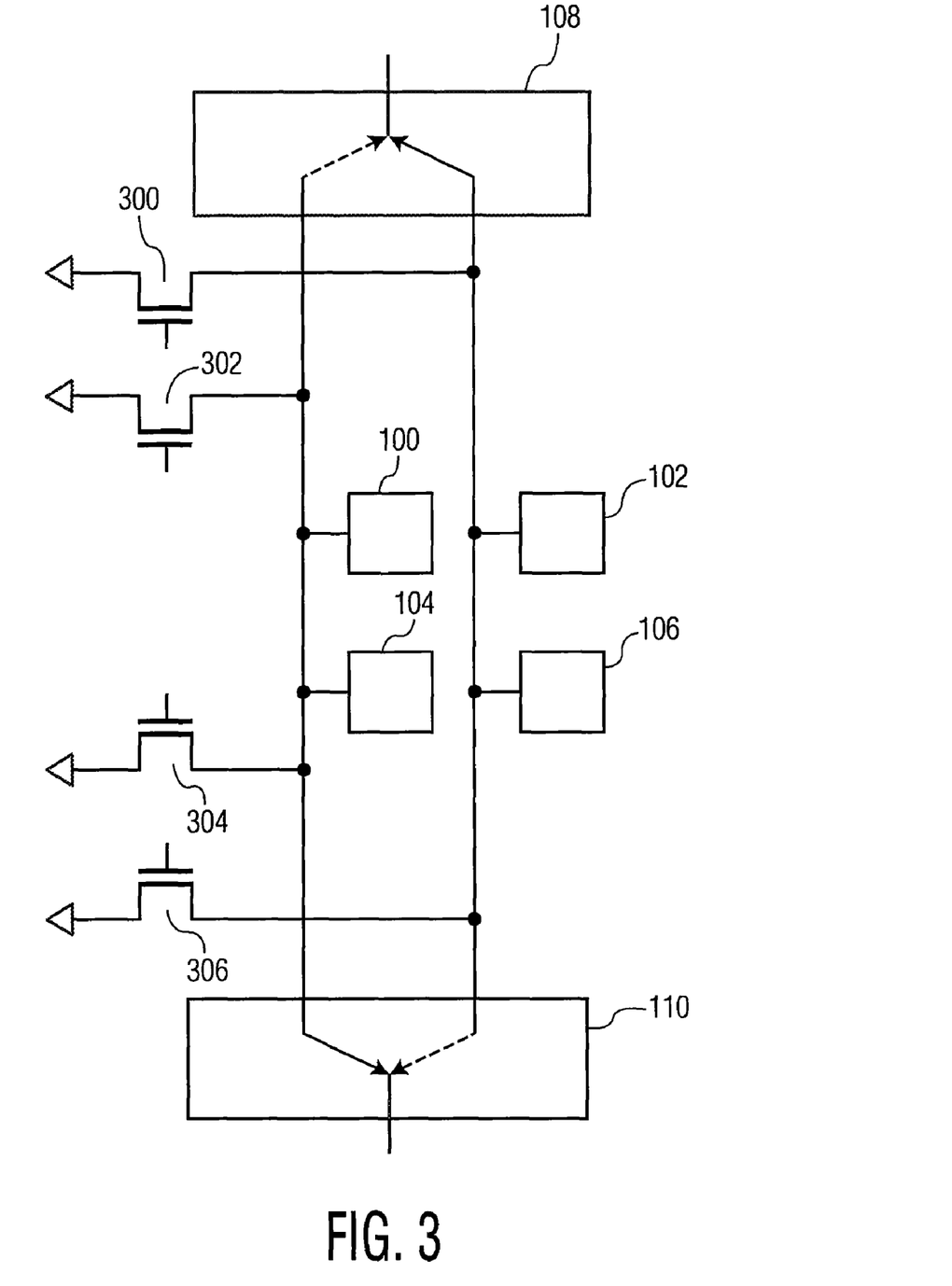
FIG. 3 is a schematic diagram of a column VLN bias arrangement used in the CMOS image sensor wherein the VLN bias is applied before the swap switch and the current is divided in half between top and bottom of the respective columns.

FIG. 3 shows a biasing arrangement that may be used in image sensors including: red pixel 100; green pixels 102 and 104; blue pixel 106; swap switches 108 and 110; and current sink transistors 300, 302, 304 and 306 for biasing the pixels during readout. The configuration as shown in FIG. 3 will be referred to as Scheme2 hereafter. Scheme2 is a configuration where current sink transistors 300, 302, 304 and 306 are coupled to the Bayer pattern pixels. In this configuration, the current sink transistors are both on the same side of the column readout and on the opposite side of the column readout as the array for all four pixels. This allows each current sink transistor to draw half as much current as each of the transistors in scheme0 and scheme1. Half the current is drawn from the top of the pixel column and half the current is drawn from the bottom of the pixel column such that the current provided by the pixel is substantially the same through both top and bottom transistors. Although the current through transistors 300, 302, 304 and 306 are substantially the same, it may differ slightly, due to process variations and operating conditions.

Operation of Scheme2 is now described with reference to FIG. 3. In one example, the readout of the Bayer pattern pixels is performed in two steps. In the first step, green pixel 102 is read from the top of the column via switch 108 while red pixel 100 is read from the bottom of the column via switch 110. In the second step, green pixel 104 is read from the top of the column via switch 108 while blue pixel 106 is read from the bottom of the column via switch 110. Current sink transistors 300 and 306 are on the same side and opposite side respectively of the top column readout for green pixel 102. Current sink transistors 306 and 300 are on the same side and opposite side respectively of the bottom column readout for blue pixel 106. Current sink transistors 302 and 304 are on the same side and opposite side respectively of the top column readout for green pixel 104. Current sink transistors 304 and 302 are on the same side and opposite side respectively of the bottom column readout for red pixel 100. During top and bottom readout of pixels 100, 102, 104 and 106, each transistor 300, 302, 304 and 306 is controlled by biasing voltage VLN to conduct half the current as in scheme0 and scheme1. This configuration allows only half of the pixel current to flow across the pixel column to each current sink as compared to scheme0 and scheme1. The smaller amount of current being drawn on the same side of the column readout for all four pixels results in a smaller DC voltage difference between the top/bottom readout path as compared to scheme0 and scheme1. Scheme2 also generates much smaller vertical shading after correlated double sampling (CDS) as compared to scheme0 and scheme1. This scheme also results in good linearity properties of the DC gain at the pixel output. Similar to Scheme1, swap switches 108 and 110 are not connected to the DC path of the pixel readout circuit, and therefore Scheme0 also has improved DC gain linearity in the pixel output.

Figure 4:
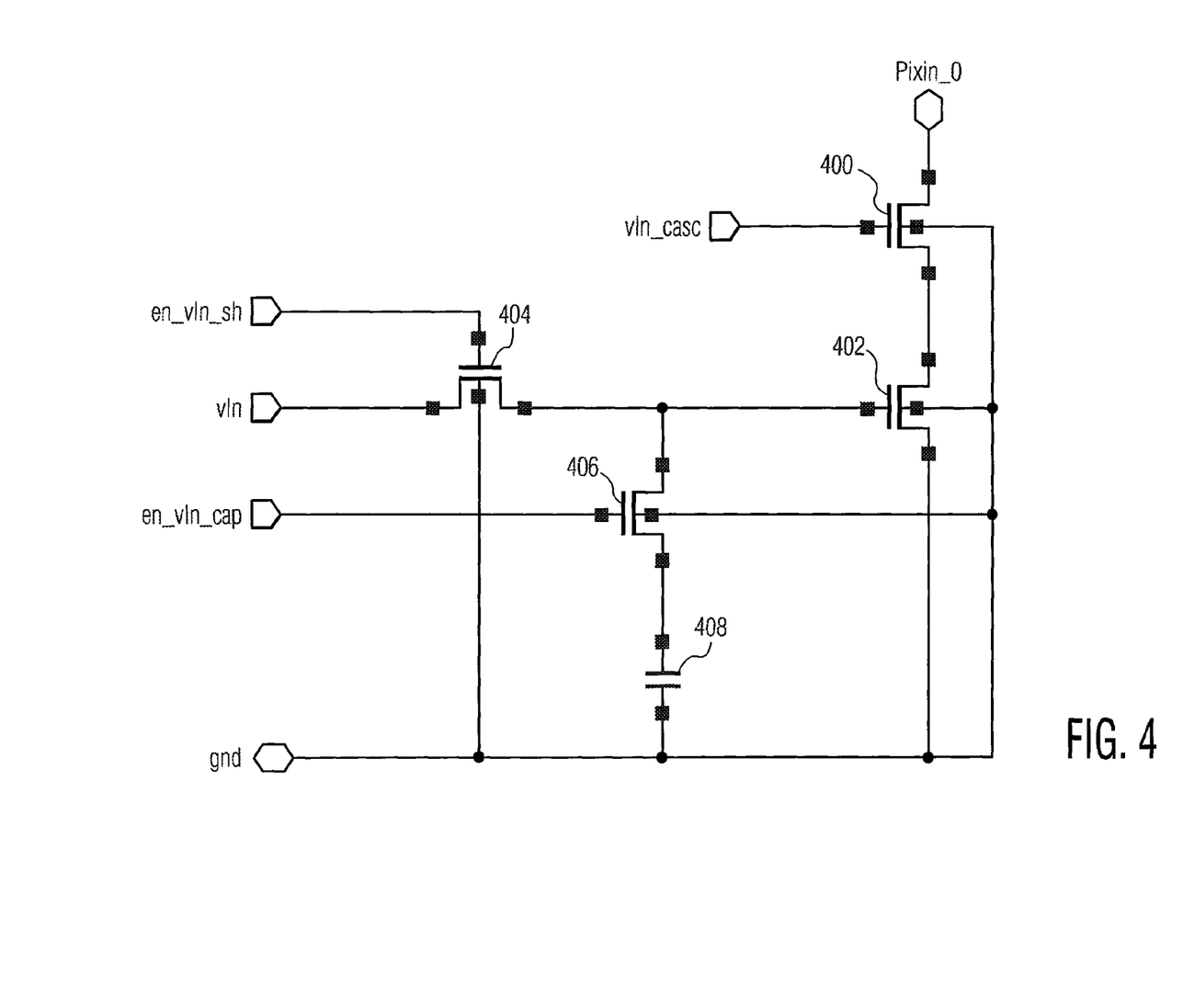
FIG. 4 is a schematic of the VLN column module that may be utilized for biasing the columns in FIGS. 1, 2 and 3.

FIG. 4 shows a schematic diagram of an example column biasing circuit suitable for use in the circuit shown in FIG. 3, including: transistors 400 and 402 which couple the pixel column to ground; transistor 406 which couples the biasing signal to capacitor 408; and transistor 404 which couples the biasing signal to transistor 402 and 406.

Transistors 400 and 402 together, along with the bias circuitry inside the VLN generator (not shown), form the configuration of a wide swing cascode current mirror. One feature of this circuit is good performance in both swing range and output resistance. Transistor 404 is an enable switch of the column sample and hold VLN bias signal. Transistor 406 is the enable switch of the sample and hold which enables storage of the VLN biasing signal on capacitor 408.

Operation of the column module with VLN biasing is now described with reference to FIG. 4. A current signal pixel value, pixin_0, from the column of pixels is applied to the source of transistor 400. In order to bias the pixel column, transistor 404 is turned on by enable signal en_vln_sh. This allows bias signal VLN to be applied to the gate of transistor 402. Both bias signal VLN and cascode control signal vln_casc are generated by the current flowing through the input path of the wide swing cascode current mirror to control the current through the output path. As bias signal VLN is applied to the gate of transistor 402 and VLN cascode control signal vln_casc is applied to transistor 400, current flows from the pixel column to ground terminal gnd. The voltage at the drain of transistor 400 is the pixel signal applied to the output sample and hold circuit of the imager. In addition, the VLN bias voltage may be sampled by capacitor 408. In order to sample the VLN bias voltage, transistor 406 is enabled by VLN capacitor enable signal en_vln_cap. The VLN bias voltage is stored by charging capacitor 408. The stored charge may then be used to drive the gate of transistor 402 when transistor 404 is turned off. In an analog mode, the VLN cascode signal vln_casc allows transistors 400 and 402 to operate as an output path of a wide swing cascode current mirror wherein their conductance may be between a minimum and maximum conductance value. In a digital mode, however, the VLN cascode signal allows transistor 400 to function as a switch and thus maximally conduct in an on state or minimally conduct in an off state. For example, in a digital mode, transistor 400 will either be off or on, thus drawing or not drawing current from the pixel column.

In one example, a respective biasing circuit as shown in FIG. 4 may be used in place of each of the transistors 300, 302, 304 and 306 in FIG. 3. For example, the source terminal of transistor 400 may be coupled to the top or bottom of the pixel columns and the circuit shown in FIG. 4. One drawback to replacing each of the transistors in FIG. 3 with the biasing circuit of FIG. 4, is that each biasing circuit has duplicate, and thus unnecessary, enabling transistors (e.g. 404 and 406) and capacitors (408).

Figure 5:
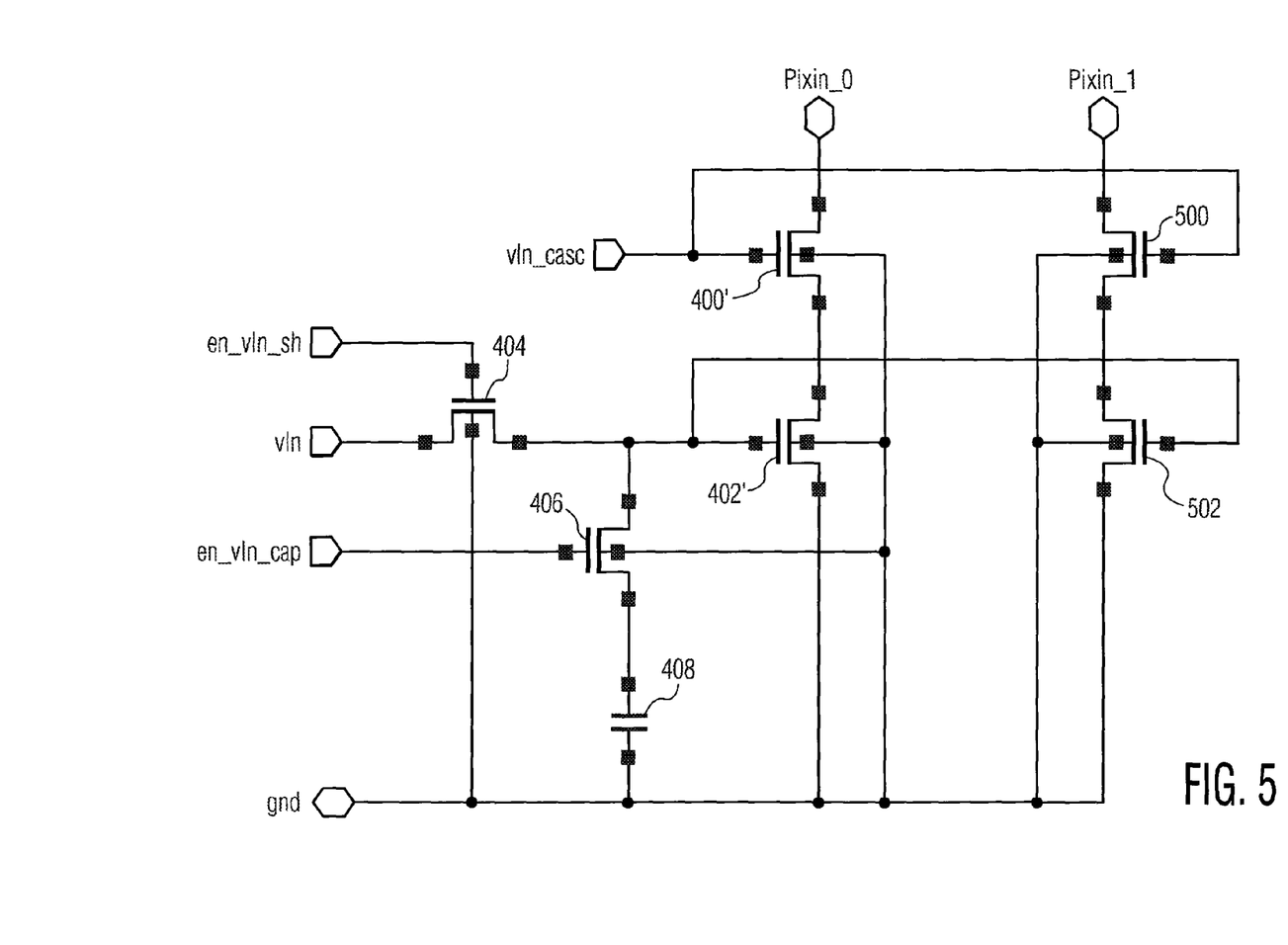
FIG. 5 is a schematic diagram of the VLN column module which is utilized for biasing the columns in FIG. 3.

An efficient biasing circuit that shares the enabling transistors and capacitor for each pixel row, is shown in FIG. 5. FIG. 5 is a schematic diagram of a biasing circuit that may replace the current sink transistors 300 and 302 or transistors 304 and 306 shown in FIG. 3. The circuit includes transistors 400' and 402' that couple a pixel column to a ground; transistors 500 and 502 that couple an adjacent pixel column to ground; transistor 404 that couples the biasing signal to transistors 406, 402' and 502; and transistor 406 that couples the biasing signal to capacitor 408. Transistors 400' and 500 are the same size, and have a total combined size that is equivalent to transistor 400 as shown in FIG. 4. Similarly, transistors 402' and 502 are the same size, and have a total combined size that is equivalent to transistor 402 as shown in FIG. 4.

As described above with reference to FIG. 5, transistor pair 400' and 402' and pair 500 and 502, along with the bias circuitry inside the VLN generator (not shown), form two output paths of a wide swing cascode current mirror. Transistor 404 is an enable switch of the column sample and hold VLN bias signal. Transistor 406 is the enable switch of the sample and hold capacitor 408, which is utilized as an analog memory for the VLN bias signal.

Operation of the column module with VLN biasing is now described with reference to FIG. 5. The circuit in FIG. 5 operates similarly to the circuit in FIG. 4, except for the addition of an adjacent output path of the current mirror which is connected to an adjacent pixel column in the imager. The value pixin_1 from a the adjacent column of pixels is applied to the drain of transistor 500. In order to bias the adjacent pixel column, transistor 404 is turned on by enable signal en_vln_sh. This applies bias signal VLN to the gates of transistors 402' and 502. As bias signal VLN is applied to the gates of transistors 402' and 502, VLN cascode control signal, vln_casc, is applied to the gates of transistors 400' and 500, thereby allowing current to flow from the adjacent pixel column to a reference potential. In FIG. 3, the drain terminals of transistor 400' and 500 are coupled to the top of the pixel columns so that transistors 400' and 402' replace transistor 300, and transistors 500 and 502 replace transistor 302. In a duplicate biasing circuit, the source terminals of transistor 400' and 500 are coupled to the top of the pixel columns so that transistors 400' and 402' replace transistor 304, and transistors 500 and 502 replace transistor 306.

Figure 6:
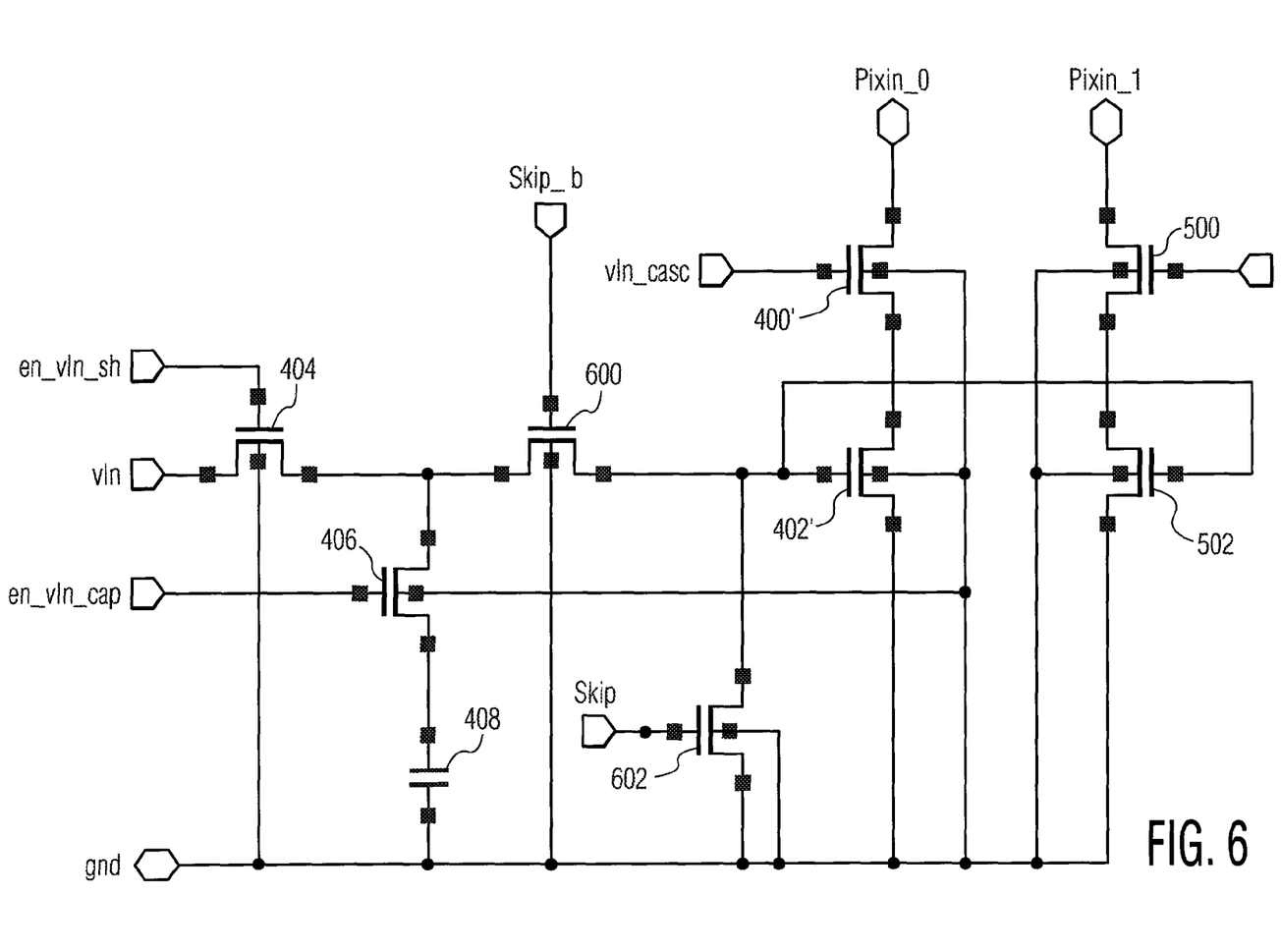
FIG. 6 is a schematic diagram of the VLN column module as shown in FIG. 5 with the addition of skip circuitry which may power down selected columns in the image array.

An additional feature that may be added to the evenly split VLN column biasing circuit of FIG. 5, are skip transistors that allow the system to selectively skip a column of pixels during a sub-sampling operation to save power. This feature is shown in FIG. 6. Specifically, transistor 600 is coupled between the VLN enabling transistor 404 and current sink transistor 402'. Skipping transistor 600 is coupled to another skipping transistor 602 which selectively connects the gates of current sink transistors 402' and 502 to ground, thus preventing them from drawing current from the columns during readout. When a column is selected to be skipped, skip transistor 600 is controlled by signal skip_b to stop conducting, thus preventing VLN biasing signal from being applied to transistors 402' and 502. Thereafter, skip transistor 602 is controlled by the signal skip to begin conducting, thus coupling the gates of transistors 402' and 502 to a reference potential. In skip mode, any pair of columns may be selectively skipped in order to save power during a sub-sampling operation.

Figure 7:
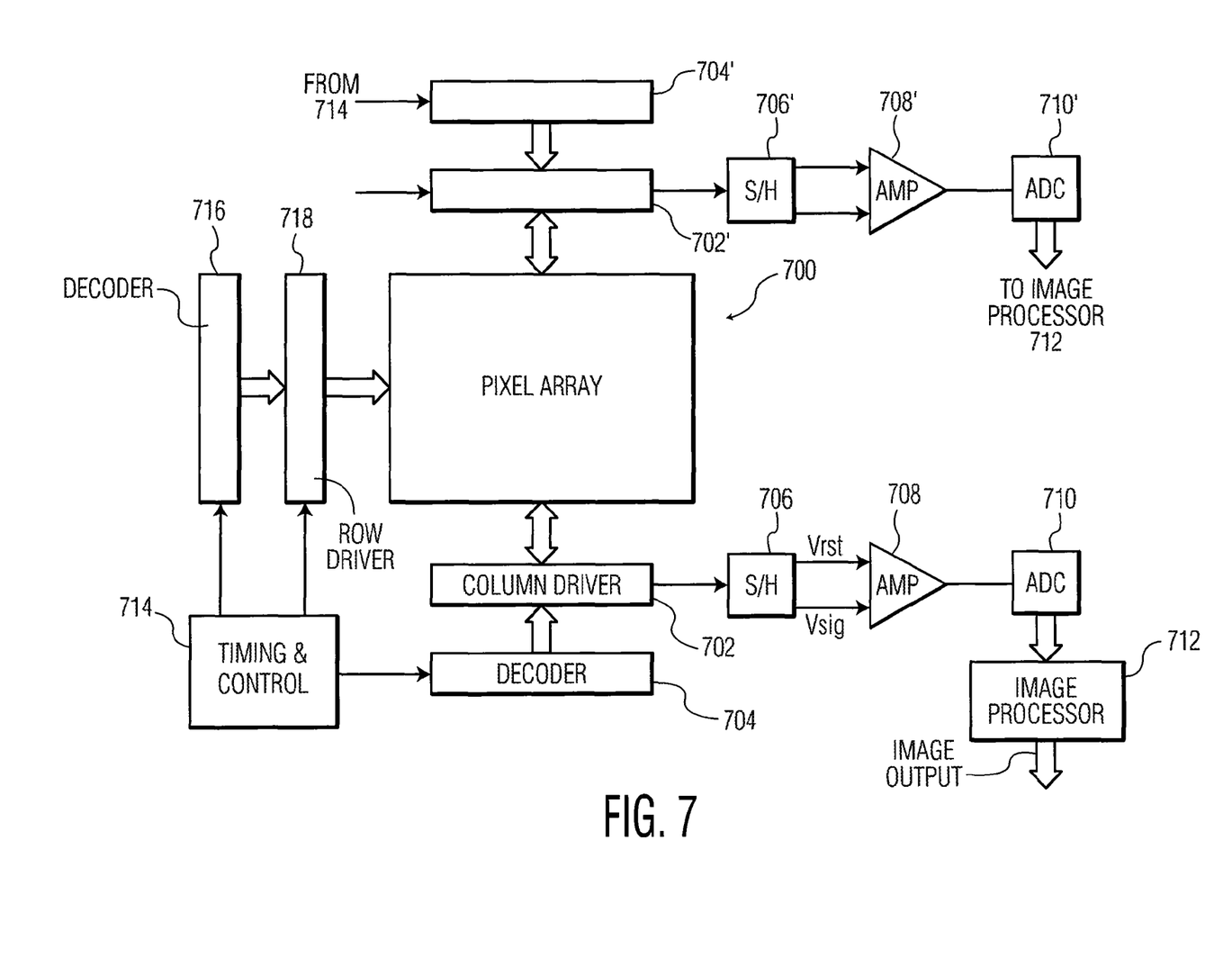
FIG. 7 is a block diagram of a CMOS imager that may utilize the biasing circuitry as shown in FIG. 4, 5 or 6.

The above described VLN biasing may be utilized in an imager circuit. FIG. 7 shows an imager circuit including: pixel array 700 for capturing light intensity, column drivers 702 and 702'; row driver 718; decoders 704' and 704 for controlling the top and bottom column drivers; decoder 716 for controlling the row driver; sample and hold 706' and 706 for sampling the pixel values on the top and bottom of each column, amplifiers 708 and 708' for amplifying the sampled pixel values; analog to digital converters 710 and 710' for converting the analog pixel values to digital values, image processor 712 for processing the digital pixel values, and timing and control 714 for controlling and synchronizing the readout of the pixel values.

Operation of the imager circuit utilizing VLN biasing is now described. Column driver 702 is coupled to the top and bottom of each column in pixel array 700. VLN biasing transistors are also connected to the top and bottom of each column in pixel array 700. In one example, the VLN biasing circuit as shown in FIG. 5 or 6 is connected to the top and bottom of the columns. When column driver 702 reads a selected column from pixel array 700, the VLN biasing transistors are utilized to sink a specified amount of current from both the top and bottom of the column which results in a voltage signal on the column that accurately represents the pixel value over a range of voltages that can be digitized by the ADC's 710 and 710'. The readout circuit comprising sample and hold 706, amplifier 708 and analog to digital converter 710. The pixel voltage is then sampled and processed to subtract a reset voltage that was previously sampled during a pixel reset state. The actual pixel value is the difference between the pixel voltage obtained during readout and the reset voltage obtained during reset state (correlated double sampling). The actual pixel value is then amplified and converted to the digital domain for processing.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A biasing circuit, for an imager having a first column of pixels, the first column having a top and a bottom, the top of the first column of pixels being coupled to a top column readout circuit, the bottom of the first column of pixels being coupled to a bottom column readout circuit, the biasing circuit comprising:
a first current sink coupled to the top of the first column of pixels;
a second current sink coupled to the bottom of the first column of pixels; and
wherein each of the first and second current sinks has a respective control terminal which controls a conductance of the respective first and second current sink.

2. The biasing circuit of claim 1, further including:
a second column of pixels having a top and a bottom, the top of the second column of pixels being coupled to the top column readout circuit, the bottom of the second column of pixels being coupled to the bottom column readout circuit, the biasing circuit further comprising:
a third current sink coupled to the top of the second column of pixels,
a fourth current sink coupled to the bottom of the second column of pixels; and
wherein each of the third and fourth current sinks has a respective control terminal which controls a conductance of the respective third and fourth current sink.

3. The biasing circuit of claim 2, including:
a top swap switch coupling the top of the first column and the top of the second column to the top column readout circuit, the top swap switch alternately coupling the first and second column to the top column readout circuit; and
a bottom swap switch coupling the bottom of the first column and the bottom of the second column to the bottom column readout circuit, the bottom swap switch alternately coupling the second and first column to the bottom column readout circuit.

4. The biasing circuit of claim 2, including:
an enabling switch coupled to the control terminals of each respective first, second, third and fourth current sink, the enabling switch selectively applying a control signal to control terminals of each respective first, second, third and fourth current sink to control the conductance of the respective current sink.

5. The biasing circuit of claim 2, including:
first, second, third and fourth skip switches coupled to the control terminals of each respective first, second, third and fourth current sink, the first, second, third and fourth skip switches blocking respective control signals that control the conductance of the respective first, second, third and fourth current sink, and
fifth, sixth, seventh and eighth skip switches coupled to the control terminals of each respective first, second, third and fourth current sink current sink, the fifth, sixth, seventh and eighth skip switches coupling the control terminals of the respective first, second, third and fourth current sink current sink to a reference potential.

6. A method for controlling a bias circuit for an imager, including a first column of pixels, said method comprising:
controlling respective first and second current sinks to draw respective first and second currents from the top and bottom of the first column of pixels during readout.

7. A method for controlling a bias circuit for an imager according to claim 6, including a second column of pixels, said method comprising:
controlling respective third and fourth current sinks to draw respective third and fourth currents from the top and bottom of the second column of pixels during readout,
wherein the amount of current drawn by each of the of the first, second, third and fourth current sinks is substantially equal.

8. The method for controlling a bias circuit of claim 7, including:
alternately coupling the top of the first column and top of the second column to a top column readout circuit respectively; and
alternately coupling the bottom of the first column and the bottom of the second column to a bottom readout circuit respectively,
wherein the first, second, third and fourth current sinks draw respective currents regardless of how the first and second columns are coupled to the top and bottom readout circuits.

9. The method for controlling a bias circuit of claim 7, including:
selectively inhibiting the first, second, third and fourth current sinks from drawing current from the first and second columns by blocking respective biasing signals that control the conductance of the first, second third and fourth current sink, and applying a reference potential to the control terminals that controls the first, second, third and fourth current sinks, the reference potential causing the first, second, third and fourth current sinks not to draw current.

10. An imager comprising:
a plurality of pixels arranged in a matrix including a plurality of columns each column having a top and a bottom, the columns being arranged in pairs wherein pixels of a first color and second color are accessed via a first column of each pair of columns and pixels of a third and fourth color are accessed via a second column of each pair of columns, each pair of columns configured to access pixel values from the top and bottom;
a first current sink coupled to the top of the first column of pixels and a second current sink coupled to the top of the second column of pixels,
a third current sink coupled to the bottom of the first column of pixels and a fourth current sink coupled to the bottom of the second column of pixels; and
wherein each of the first, second, third and fourth current sinks has a respective first, second, third and fourth control terminal which controls the conductance of each respective first, second, third and fourth current sink during readout of the first and second pixel column.

11. The imager of claim 10, wherein:
the first pixel color is red, the second pixel color is green, the third pixel color is light green and the fourth pixel color is blue, the pixel colors being arranged in a Bayer pattern.

12. A biasing circuit, for an imager having first and second columns of pixels each column having a top and a bottom, the tops of the first and second columns of pixels being coupled to a top column readout circuit, the bottoms of the first and second columns of pixels being coupled to a bottom column readout circuit, the biasing circuit comprising:
a first transistor having a first channel coupled between the top of the first column of pixels and a first source of reference potential, a second transistor having a second channel coupled between the top of the second column of pixels and the first source of reference potential, a respective conductance of the first and second channels of the first and second transistors being controlled by a first biasing signal applied to respective control terminals of the first and second transistors, a third transistor having a third channel coupled between the bottom of the first column of pixels and the second source of reference potential, a fourth transistor having a fourth channel coupled between the bottom of the second column of pixels and the second source of reference potential, a respective conductance of the third and fourth channels of the third and fourth transistors being controlled by a second biasing signal applied to respective control terminals of the third and fourth transistors.

13. The biasing circuit of claim 12, including:

a first enabling switch coupled to the control terminals of the first and second transistors, the first enabling switch applying the first biasing signal to the control terminals of the first and second transistors; and a second enabling switch coupled to the control terminals of the third and fourth transistors, the second enabling switch applying the second biasing signal to the control terminals of the third and fourth transistors.

14. The biasing circuit of claim 12, including:

a first capacitor;

a second capacitor;

a first capacitor enabling switch coupled to the control terminals of the first and second transistors and the first capacitor, the first capacitor enabling switch applying the first biasing signal to charge the first capacitor; and a second capacitor enabling switch coupled to the control terminals of the third and fourth transistors and the second capacitor, the second capacitor enabling switch applying the second biasing signal to charge the second capacitor.

15. The biasing circuit of claim 12, including:

a first skip switch coupled to the control terminals of the first and second transistors, the first skip switch blocking the first biasing signal from controlling the respective conductance of the first and second channels of the first and second transistors; and a second skip switch coupled to the control terminals of the third and fourth transistors, the second skip switch blocking the second biasing signal from controlling the respective conductance of the third and fourth channels of the third and fourth transistors.

16. The biasing circuit of claim 15, including:

a third skip switch coupled to the control terminals of the first and second transistors and the source of reference potential, the third skip switch coupling the control terminals of the first and second transistors to the reference potential; and a fourth skip switch coupled to the control terminals of the third and fourth transistors and the source of reference potential, the fourth skip switch coupling the control terminals of the third and fourth transistors to the reference potential.

17. The biasing circuit of claim 12, including:

a fifth transistor having a fifth channel coupled between the top of the first column of pixels and the first channel, a sixth transistor having a sixth channel coupled between the top of the second column of pixels and the second channel, a respective conductance of the fifth and sixth channels of the fifth and sixth transistors being controlled by a third and fourth biasing signal, the fifth and sixth transistors having respective control terminals, and a seventh transistor having a seventh channel coupled between the bottom of the first column of pixels and the third channel, a eighth transistor having an eighth channel coupled between the top of the second column of pixels and the fourth channel, a respective conductance of the seventh and eighth channels of the seventh and eighth transistors being controlled by a fifth and sixth biasing signal, the seventh and eighth transistors having respective control terminals, wherein the fifth and first channels of the fifth and first transistors along with the seventh and third channels of the seventh and third transistors form two respective output paths of a wide swing cascode current mirror.

18. A imager circuit for capturing an image comprising:

a pixel array for representing captured light as an array of electric charges;

a top and bottom readout circuit respectively coupled to the top and bottom of pixel columns within the pixel array; and a first biasing circuit coupled to the top readout circuit and the top of the pixel array, and a second biasing circuit coupled to the bottom readout circuit and the bottom of the pixel array, wherein the first and second biasing circuits draw current from the top and bottom of the pixel array respectively during both top and bottom readout.

19. The imager circuit of claim 18, including:

the top readout circuit comprising a top sampling circuit for sampling pixel values at the top of the pixel columns during a reset state and sampling pixel values at the top of the pixel columns during top readout, the sampled pixel value during top readout being biased by the first and second biasing circuits; and the bottom readout circuit comprising a bottom sampling circuit for sampling pixel values at the bottom of the pixel columns during the reset state and sampling pixel values at the bottom of the pixel columns during bottom readout, the sampled pixel value during bottom readout being biased by the first and second biasing circuits, wherein the top and bottom readout circuits subtract the pixel values sampled during the reset state from the pixel values sampled during top and bottom readout in order to obtain a representative pixel value.

20. The imager circuit of claim 19, including:

an analog to digital converter circuit for converting the representative pixel value into a digital representative pixel value; and an image processor for processing the digital representative pixel value.

21. A method for controlling an imager, including a pixel column with a top and a bottom, said method comprising:

capturing light and representing the captured light as an array of electric charges;

translating the electric charge into a readout potential, the readout potential being read from the top and bottom of the pixel column; and biasing the readout potential by drawing a substantially equal amount of current from the top and bottom of the pixel column.

22. The method of claim 21, said method comprising:

sampling the biased readout potential from the top of the pixel column during top readout and sampling the biased readout potential from the bottom of the pixel column during bottom readout; and converting the sampled biased readout potentials to a digital signal for processing by an image processor.

* * * * *